Patented June 4, 1935

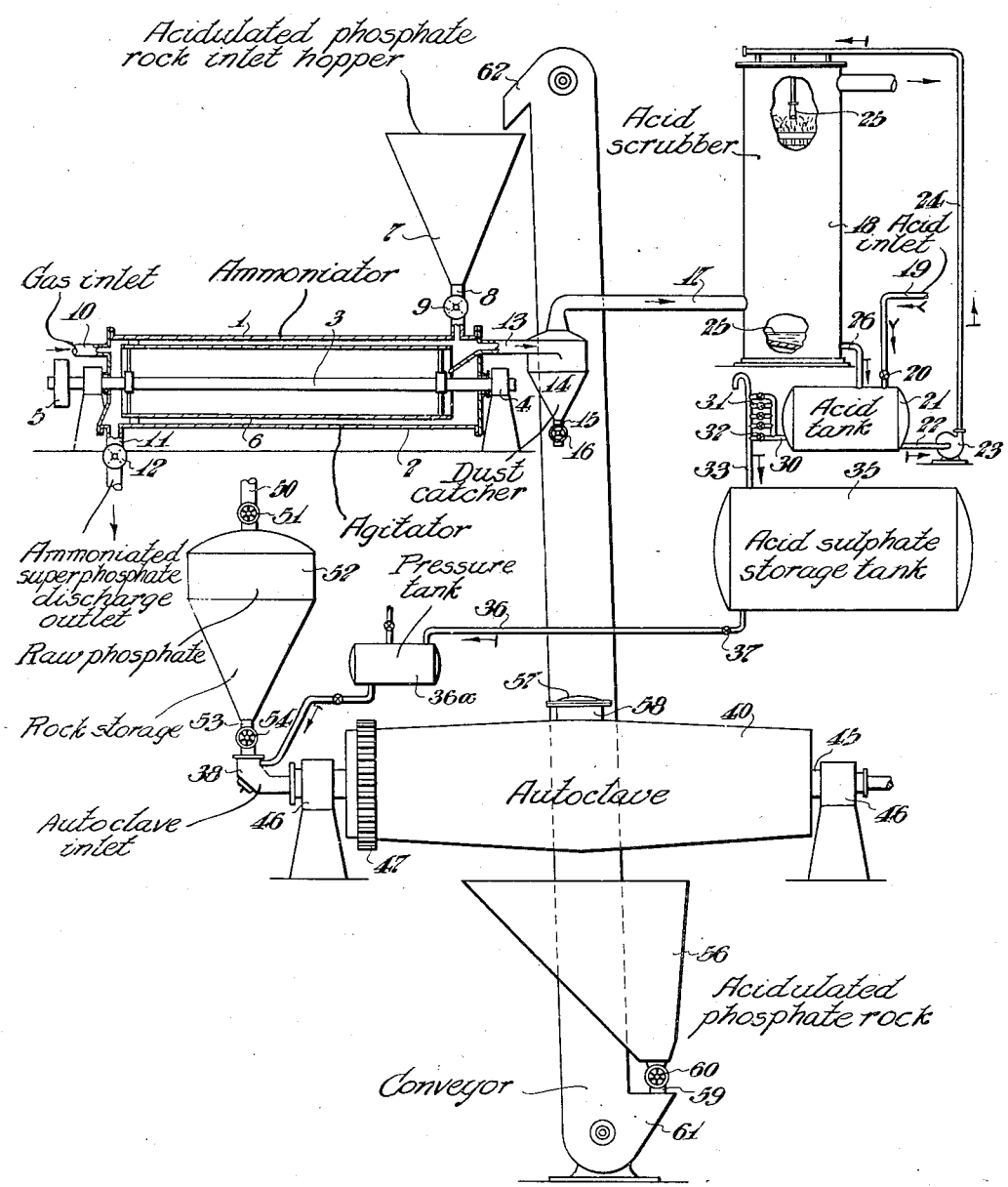

2,003,560

UNITED STATES PATENT OFFICE 2,003,560

TREATMENT OF FUEL GAS TO REMOVE AMMONIA

Mark Shoeld, Mount Lebanon Township, Allegheny County, Pa., assignor to The Koppers Company of Delaware, a corporation of Delaware Application May 3, 1932, Serial No. 608,976

2 Claims. (Cl. 23—196)

This invention relates to the removal of ammonia from fuel gas, and also to the manufacture of calcium acid phosphate fertilizer, and more particularly to a single process wherein these operations are carried out simultaneously and in cooperative relation.

In the copending applications of Frederick W. Sperr, Jr., Serial Nos. 505,090 (now Patent No. 1,980,010) and 505,091, both filed Dec. 27, 1930, it has been proposed to accomplish the entire ammonia removal, and the entire ammoniation, by passing the gas through an ammoniator containing calcium acid phosphate.

It is an object of the present invention to carry out a part of these operations as another step in the process in a novel and advantageous manner, and to permit the use of a smaller ammoniator, and to accomplish other desirable results as will hereinafter appear.

Another object is to provide freedom from close control of the acid employed in the process, and eliminate sulphate crystallization and handling.

Another object is to produce a superphosphate of high ammonia content, with low reversion of $P_2O_5$ to unavailable form during ammoniation.

Another object is to provide a complete cycle wherein raw phosphate rock and gas containing ammonia are so treated that an ammonia free gas and a very desirable fertilizer are obtained.

Further objects are to economize and improve the production and operation of methods of this character and to render them otherwise well adapted for the purposes set forth.

Other objects and features of novelty will be apparent as the following description proceeds, reference being had to the accompanying drawing, in which The single figure is a partially diagrammatic view in elevation, partly in section, showing the preferred embodiment of apparatus according to the present invention, and by means of which the preferred form of the novel process may be carried out.

Referring more particularly to the drawing, the apparatus illustrated therein comprises an ammoniator 1. Any type of ammoniator, whether rotary, tray type, louvre, or other design, is suitable for this purpose.

In the form shown, a horizontal rotary type comprises a shell 2. In this shell is mounted an agitator having a horizontal shaft 3, journaled bearings 4 outside of the shell, and driven from any suitable source of power by means of a pulley 5. The shell 2 is cylindrical, and the shaft 3 carries an inner cylinder 6 adapted to revolve therein.

The ammonia removing material, such as calcium acid phosphate, and preferably the superphosphate form is supplied to the hopper 7 from which a conduit 8 provided with a valve 9 leads to the shell 2. The gas from which the ammonia is to be removed, such as a fuel gas and preferably coke oven gas, is introduced to the shell 2 by means of an inlet conduit 10.

The rotation of the shaft 3 serves to stir the calcium superphosphate in the shell 2 and cause intimate contact thereof with the coke oven gas. This operation removes a part of the ammonia from the gas and also causes a complete ammoniation of the calcium superphoshate.

The ammoniated calcium superphosphate is discharged through an outlet conduit 11 provided with a valve 12, while the partly ammonia-freed gas passes out through an outlet conduit 13. The arrangement is such that a counterflow relation during the contacting is provided, as is desirable for this operation.

The outlet conduit 13 is arranged tangentially of a cyclone dust catcher 14, the purpose of which is to remove from the gas any entrained superphosphate material which may be carried along thereby. Such material is deposited in the bottom of the dust catcher 14 and may be discharged through an outlet 15 provided with a valve 16.

The fuel gas from which a part of the ammonia has been removed, but in which another part of the ammonia still remains, passes from the dust catcher 14 through a conduit 17 to an acid scrubber 18. Fresh acid is introduced by a pipe 19 provided with a valve 20, into an acid recirculating tank 21.

From the tank 21 a pipe 22 leads to a pump 23 having a discharge conduit 24 connected to a spray head 25 in the upper portion of the scrubber 18. With this arrangement the acid from the tank 21 may be forced by the pump 23 through the spray head 25 so as to provide intimate and counterflow contact of the acid with the coke oven gas which still contains a certain amount of ammonia.

An excess of acid is preferably provided, and sulphuric acid is preferred, although nitric, hydrochloric and other acids may be employed for this purpose. The acid descends to the bottom of the scrubber 18 absorbing all of the ammonia from the gas passing therethrough. This acid containing ammonia collects in a sump 25 at the bottom of the scrubber 18 from which it is withdrawn by a pipe 26 to the acid recirculating tank 21.

An outlet 30 in the tank 21 is provided with selective level drawoff lines 31 provided with valves 32 and a vent whereby the acid may be withdrawn from the tank 21, depending upon the level of the acid it is desired to maintain therein. The acid withdrawn from the tank 21 passes through a pipe 33 into an acid sulphate storage tank 35, from which the same may be withdrawn by a pipe 36 provided with a valve 37 and leading to the inlet 38 of an autoclave 40. A tank 36a may be placed in the line 36 wherein the acid sulphate solution may be placed under pressure and forced into the inlet 38.

The autoclave 40 comprises, in the form shown, a shell or drum mounted on a horizontal shaft 45 carried by bearings 46. The shell is provided with an annular gear 47 by means of which the same may be rotated by any suitable source of power.

The shaft 45 at the end adjacent the inlet 38 is hollow so that the autoclave may be charged through the bearing 46 at that end of the shaft. Raw phosphate rock, preferably ground to a suitable size, is introduced through a conduit 50 provided with a valve 51 into a raw rock phosphate storage hopper 52.

The raw phosphate rock is withdrawn as desired through a conduit 53 provided with a valve 54 and introduced through the inlet 38 into the autoclave 40. The introduction of the acid sulphate through the line 36 into the inlet 38 effects a mixture of this material with the raw phosphate rock.

Further mixture is afforded by rotation of these materials in the autoclave under conditions of thorough and intimate contact. When the reaction is completed, the autoclave is stopped and its contents are discharged into a hopper 56. This may be accomplished by removing a cover 57 from an outlet 58 provided in the shell of the autoclave.

From the hopper 56 a conduit 59 provided with a valve 60 feeds the acid phosphate into a bucket conveyor or other elevator 61. This apparatus carries the superphosphate material up to the discharge spout 62 from which this material descends into the hopper 7 for introduction into the shell 1 in the manner hereinbefore described.

Thus in the operation of the process, coke oven gas, or other gas containing small amounts of ammonia, is passed through the ammoniator 1 substantially countercurrent to a feed of calcium superphosphate containing some ammonium sulphate. The gas from the ammoniator 1 is carried through the small acid scrubber 18, to remove the last traces of ammonia.

The excess of acid is used in this acid scrubber to prevent formation of solid ammonium sulphate. The acid sulphate solution from the scrubber 18 is used to acidulate raw rock phosphate in the autoclave 40.

The product of this acidulation is a superphosphate containing some ammonia. This material is then used in the ammoniator as above described for the preliminary removal of ammonia from the gas. Due to the fact that it is already partially ammoniated as it comes to the ammoniator, the discharge from the ammoniator is a very highly ammoniated superphosphate with very little reversion.

From the foregoing description it will be readily apparent that a small ammoniator may be used for the ammoniation, since it is only necessary to remove about half of the ammonia from the gas in the ammoniator. The acid scrubber then gives the final cleaning of the ammonia from the gas.

The excess of acid used in the acid scrubber provides freedom from close control on the acid. It also eliminates sulphate crystallization and handling, which is a paramount advantage.

The use of the acid sulphate solution to acidulate the phosphate rock gives an acidulated superphosphate containing ammonia, which upon ammoniation yields a high ammonia superphosphate with low reversion of the available $P_2O_5$ to the unavailable form during ammoniation.

The process provides a complete cycle wherein raw phosphate rock and gas containing ammonia are so treated that an ammonia-free gas and a very desirable high ammonia superphosphate are obtained.

While the preferred embodiment of the present invention has been illustrated and described, the invention is not limited to the details disclosed but instead includes such embodiments of the broad idea as fall within the scope of the appended claims.

I claim as my invention:

1. A process of purifying fuel gas of ammonia, which comprises: scrubbing the gas, after it has been pre-treated with partly ammoniated acidulated phosphate rock to partially remove the ammonia from the gas, with a solution of an excess of acid to remove last traces of ammonia from the gas and form an acid ammonium compound solution; acidulating phosphate rock with the acid ammonium compound solution formed thereby forming partly ammoniated solid acidulated phosphate rock; and effecting the pre-treatment of the fuel gas to partially remove the ammonia of the gas by direct contact thereof with the partly ammoniated solid acidulated phosphate rock so formed, thereby completing the purification of the gas of its ammonia with the production of a single end product of solid ammoniated calcium phosphate containing all of the ammonia removed from the gas.

2. A process of purifying fuel gas of ammonia, which comprises: scrubbing the gas, after it has been pre-treated with partly ammoniated acidulated phosphate rock to partially remove the ammonia from the gas, with a solution of an excess of $H_2SO_4$ to remove last traces of ammonia from the gas and form an acid ammonium sulphate solution; acidulating the phosphate rock with the acid ammonium sulphate solution so formed thereby forming partly ammoniated solid acidulated phosphate rock; and effecting the pre-treatment of the fuel gas to partially remove the ammonia of the gas by direct contact thereof with the partly ammoniated solid acidulated phosphate rock so formed, thereby completing the purification of the gas of its ammonia with the production of a single end product of solid ammoniated calcium phosphate containing all of the ammonia removed from the gas.

MARK SHOELD.